United States Patent [19]

Gardner Sr.

[11] Patent Number: 4,891,117

[45] Date of Patent: Jan. 2, 1990

[54] METHOD AND APPARATUS FOR INSTALLING GASKET MEMBERS BETWEEN FLAT PLATE STRUCTURES

[75] Inventor: Gary L. Gardner Sr., Lake Jackson, Tex.

[73] Assignee: The Dow Chemical Company, Midland, Mich.

[21] Appl. No.: 220,059

[22] Filed: Jul. 15, 1988

[51] Int. Cl.$^4$ .................. C25B 9/00; C25B 13/00
[52] U.S. Cl. .................. 204/253; 204/255; 204/257; 204/269; 204/279; 210/230; 210/231; 277/180; 277/228
[58] Field of Search .............. 204/279, 253, 254, 267, 204/268, 255–258, 269; 277/180, 235 B, 227, 228; 210/230–231

[56] References Cited

U.S. PATENT DOCUMENTS

| | | | |
|---|---|---|---|
| 3,462,161 | 8/1969 | Daubenberger et al. | 277/180 X |
| 3,490,776 | 1/1970 | Avery | 277/180 |
| 4,339,324 | 7/1982 | Haas | 204/269 X |
| 4,712,585 | 12/1987 | Evans | 277/180 X |
| 4,751,153 | 6/1988 | Roth | 204/253 |

Primary Examiner—Donald R. Valentine

[57] ABSTRACT

A method and device for installing gasket members between two adjacent flat plate structures including removably attaching a gasket member on each side of a frame member to form a frame member and gasket member assembly, interposing the frame member and gasket member assembly between at least two cell frame members disposed adjacent to each other, and contacting the flat plate structures with the frame member and gasket member assembly such that the gasket members adhere diametrically opposed to each other on the flat plate structures. The frame member includes a rib portion around the outer periphery of the frame member, the rib portion forming a pair of shoulders opposite each other and facing away from each other and adapted for receiving a pair of gasket members such that the gasket members contact the rib portion and protrude a predetermined distance beyond the shoulder members.

14 Claims, 2 Drawing Sheets

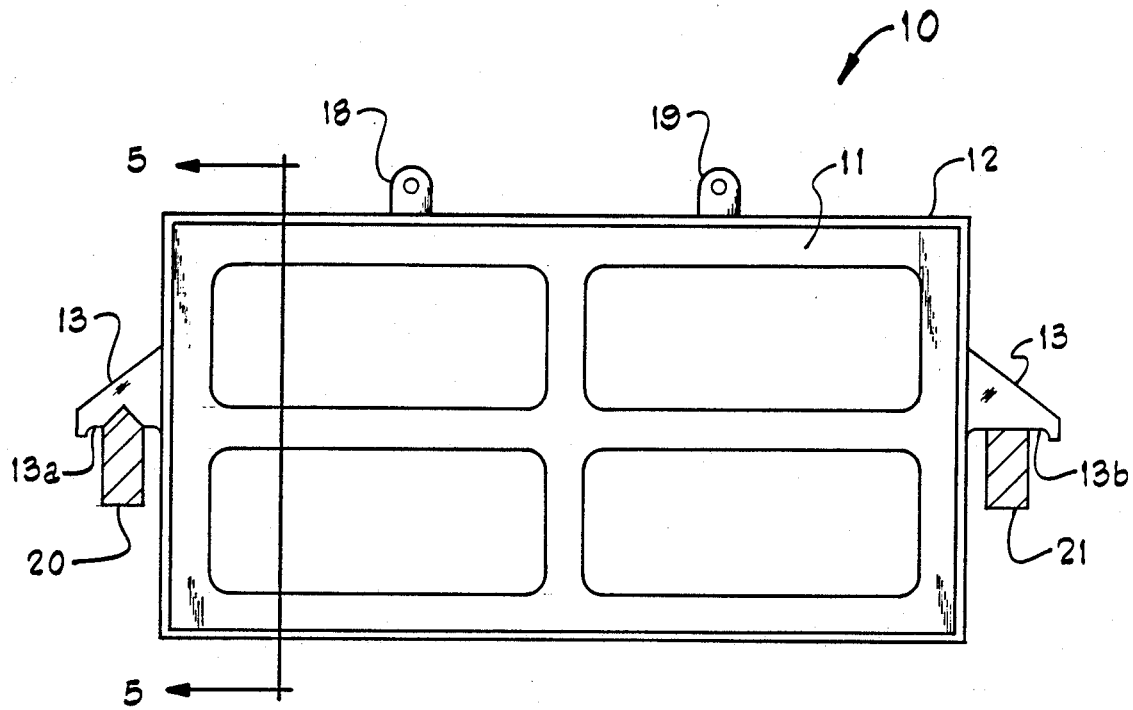
FIG. 4
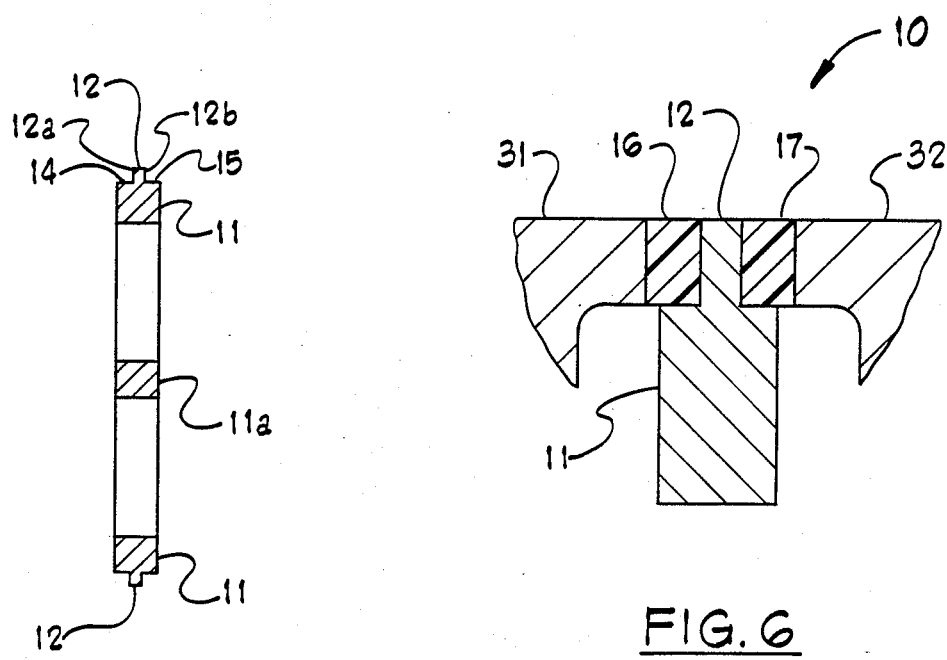
FIG. 5
FIG. 6

METHOD AND APPARATUS FOR INSTALLING GASKET MEMBERS BETWEEN FLAT PLATE STRUCTURES

BACKGROUND OF THE INVENTION

This invention relates to a method and apparatus for installing gasket members between at least two adjacent flat plate type structures for example electrolysis cell frame members such that the gasket members are substantially aligned opposite each other in mirror-like arrangement.

Electrolytic cells, particularly of the filter press type, used for the electrolysis of aqueous salt solutions are well known and have been commercially employed for the production of chlorine and caustic from brine. The filter press type cells commonly employ a plurality of frames having electrodes held thereto and assembled in filter press type arrangement, separated from each other by membranes, diaphragms or microporous separators, forming a plurality of anolyte and catholyte compartments. The cells employ separators which are generally in sheet form and have ion exchange properties. The electrodes used in the cells are generally monopolar or bipolar electrodes.

Typically, a press means such as a hydraulic squeezer unit is used to compress or clamp together the separators in sheet form between the sides of the frame members of the filter press cell and electrolyte fills the compartments of the cell. Typically, to provide a fluid tight seal between the frame members and the separator without damaging the separator, the electrolytic cells employ substantially flat, solid gaskets having a rectangular cross sectional area or tubular type gaskets having a circular cross sectional area made of elastomeric materials. One or two gaskets can be used to fit between the cell frame members on either side of the membrane.

When two gaskets are placed between two adjacent cell frame members and one gasket is placed on each side of a membrane, the gaskets have to be aligned exactly diametrically opposed to each other on each side of the membrane to avoid the problem of misaligned gaskets cutting the membrane when the membrane, gaskets and cell frames components are squeezed together by a compressive force. A damaged membrane, of course, can disrupt operation of the cell.

Heretofore, two gaskets where placed between two adjacent cell frame members manually by several personnel who would visually align the gaskets on each side of the membrane. Another method used for aligning the gaskets between two cell frame members, included making marks on the outer face of each cell frame member and then placing the gaskets on the marks using the marks as guides for alignment. The above methods were time consuming and required an extensive effort by personnel to carry out. Usually, the above methods did not provide a satisfactory alignment of the gaskets which, in turn, resulted in misaligned gaskets damaging a membrane which was placed between the misaligned gaskets.

Therefore, it is desired to provide a novel method and device for solving the problems encountered with the above methods.

SUMMARY OF THE INVENTION

One aspect of the invention is directed to a method for installing gasket members between two adjacent flat plate structures including:

(a) removably attaching a gasket member on each side of a frame member having a rib portion around the outer periphery of the frame member to form a frame member and a gasket member assembly:

(b) interposing the frame member and gasket member assembly between at least two flat plate structures disposed adjacent to each other: and (c) contacting the flat plate structures with frame member and gasket member assembly such that the gasket members adhere to the flat plate structures diametrically opposed to each other.

Another aspect of the present invention is an apparatus for installing gaskets between two flat plate structures adjacent to each other comprising a frame member having a rib portion around the outer periphery of the frame member, said rib portion forming a pair of shoulders opposite each other on each side of the rib portion, said shoulders facing away from each other and adapted for receiving a pair of gasket members such that said gasket members contact the rib portion and protrude a predetermined distance beyond said shoulder member.

BRIEF DESCRIPTION OF THE DRAWINGS

FIG. 4 is a front view of another embodiment of the apparatus of the present invention hanging on side rails.

FIG. 5 is a cross section view taken along line 5—5 of FIG. 4.

FIG. 6 is a partial cross-sectional view showing a frame member of the present invention between two adjacent electrolysis cell frame members.

DETAILED DESCRIPTION OF THE PREFERRED EMBODIMENTS

Figure 1:
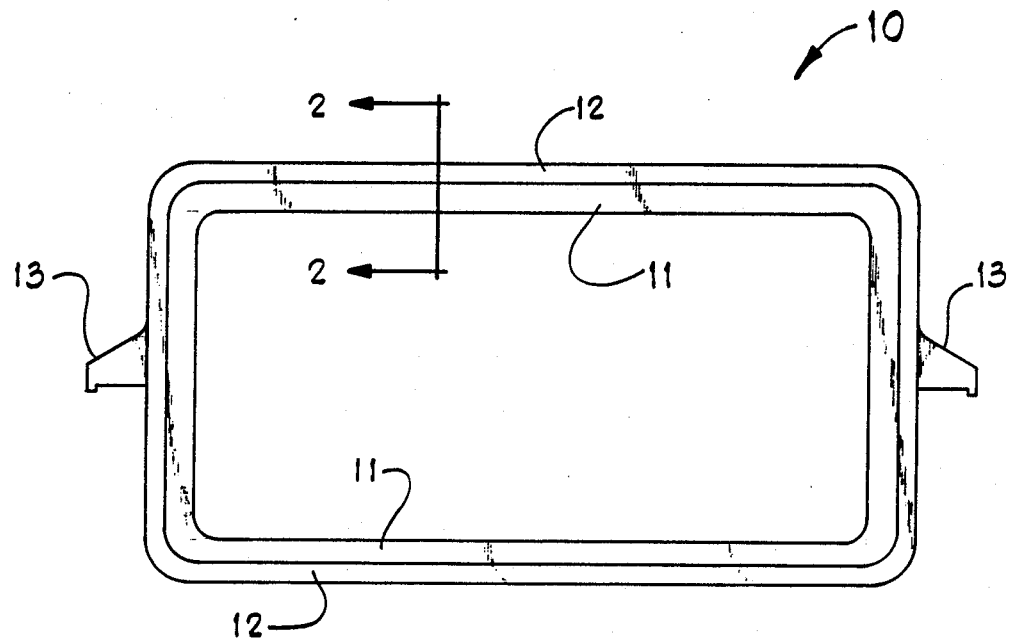
FIG. 1 is a front view showing one embodiment of the apparatus of the present invention with two gaskets mounted thereon.
Figure 2:
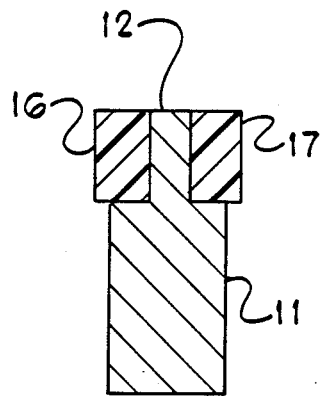
FIG. 2 is a cross section view taken along line 2—2 of FIG. 1.
Figure 3:
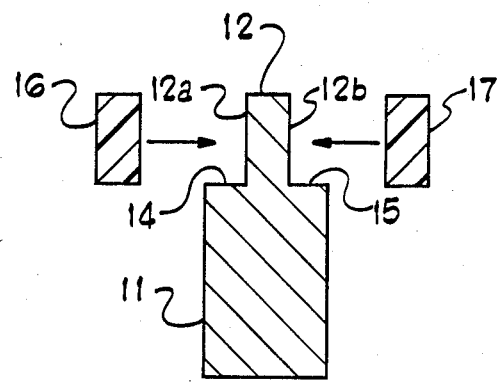
FIG. 3 is an exploded view of FIG. 2.

With reference to FIGS. 1-3, there is shown an apparatus, generally indicated by numeral 10, for installing gaskets between at least two adjacent flat plate structures such as electrolysis cell frame members. For example, the electrolysis cell frame members can be two adjacent electrolysis cell frame members which are part of a plurality of electrolysis cell frame members forming an electrolyzer cell unit of the membrane-type.

The apparatus 10, in this instance, is in a picture frame type body member 11 with a rib portion 12 extending all around the periphery of the picture frame member 11. Preferably, the rib portion 12 is centered around the outer periphery of the frame member 11. Two support members 13 are attached to the rib portion 12 on two opposite sides of the picture frame body 11 for hanging the frame member 11 on side rails (shown as 20 and 21 in FIG. 4) of a conventional squeezer apparatus (not shown) for compressing the frame members 11 together. The rib portion 12 of the frame member 11, which is of narrower dimension than that of the main body of the frame 11, forms wall portions 12a and 12b and two shoulder portions on the main body of the frame 11, which are indicated by numerals 14 and 15, respectively. The two shoulder portions 14 and 15 are each adapted for positioning a gasket member 16 and 17 thereon. The gaskets 16 and 17 and shoulder portions 14 and 15 are separated by the rib portion 12 so that the gaskets cannot contact each other.

Again, with reference to FIGS. 1–3, gaskets 16 and 17, which are to be attached to electrolysis cell frame members, are mounted upon the shoulder portions, 14 and 15, respectively, and against the rib wall portions 12a and 12b, respectively. The rib portion 12 separates the gasket members on the shoulder portions and correspondingly the two gasket members 16 and 17 are aligned diametrically opposed to one another.

In FIGS. 4 and 5, there is shown a preferred frame member 10 for installing gaskets between at least two flat plate structures such as electrolysis cell frame structures. In this embodiment, the frame member body 11 has a reinforcing cross sectional body portion 11a for providing stiffness and integrity to the frame member. Optionally, the body portion 11 can be solid (not shown) throughout the entire cross section of the frame member 10. The frame member 10 preferably has two lifting lugs 18 and 19 for ease of lifting the frame member 10 and placing it on rails 20 and 21 of a squeezer apparatus. The support members 13 of the frame member 10 may have different or similar bottom surfaces which come in contact with the rails 20 and 21, for example a V-shape surface and a flat surface, 13a and 13b, respectfully, as shown in FIG. 4.

The frame 10 can be made of any suitable material having some rigidity for handling, for example, metal such as aluminum, brass or plastic such as fiber reinforced plastic (FRP), or wood.

The gasket members 16 and 17 may be made of various materials. The selection of material for the gasket depends on the application the gasket will be used. For example, the gaskets may be made of rubber or elastomeric materials when used in chlor-alkali cells. The gaskets should be made of material which is physically and chemically stable in contact with the electrolyte and the products of electrolysis present in a chlor-alkali cell. In the production of chlorine and caustic, for example, the gaskets 16 and 17 must, of course, be substantially inert to acid, brine, chlorine, hydrogen and caustic. In addition, the gaskets are preferably, electrically nonconductive. Furthermore, the gaskets should be of a material having high volume resistivity and good sealability after it has been compressed.

Suitable materials which can be employed for gaskets 16 and 17 in accordance with the present invention include, but are not limited to, for example, Neoprene, butyl rubber, ethylene propylene diene (EPDM), chlorinated polyethylene (CPE) and a polytetrafluoroethylene (PTFE) such as Teflon, a trademark of E. I. DuPont De Nemours and Company. The hardness of the gasket material may vary with the material used. For example, the hardness of EPDM gasket used may range from about 60 durometer to about 90 durometer.

With reference to FIG. 6 and in carrying out a preferred method of the present invention, gaskets 16 and 17 are mounted on the frame member 10 using an adhesive or stick tape to hold the gaskets in place on the frame member 10 seated against the walls 12a and 12b of the rib 12 and shoulder portions 14 and 15 of the frame member body 11. An adhesive or stick tape is also applied to the the other side of the gasket which is to contact the electrolysis cell frame member. Then two adjacent electrolysis cell frame members 31 and 32 supported on the side rails of a squeezer apparatus (not shown) are pulled apart to provide a space to interpose the frame member 10 with gaskets 16 and 17 mounted thereto. Then, using a bridge crane means, for example, the frame member 10 with the gaskets 16 and 17 attached thereto is interposed between the two electrolysis cell frame members 31 and 32 which have been pulled apart on the side rails of the squeezer. The support hangers 13 of the frame member 10 are used to hang the frame member 10 on the side rails 20 and 21. One of the two electrolysis cell frame members, for example cell frame member 31, is contacted with the frame member 10 to transfer one of the gaskets, for example gasket 16, to the electrolysis cell frame member 31. Then, the other electrolysis cell frame member, for example cell frame member 32, is contacted with the frame member 10 to transfer the other gasket, for example gasket 17, to the other cell frame member 32. Of course, the electrolysis cell frame members 31 and 32 can be simultaneously compressed together with the frame member 10 sandwiched therebetween to transfer both gaskets 16 and 17 to the electrolysis cell frames 31 and 32, respectively, at the same time. The electrolysis cell frame members 31 and 32 are then pulled away from the frame member 10. The gaskets 16 and 17 adhere to the electrolysis cell frame members 31 and 32, respectively, and then the frame member 10 without the gaskets is removed from between the electrolysis cell frame members 31 and 32.

Preferably, any residual adhesive on the gasket side that was used to sit the gaskets on the frame member 10 is removed with a suitable solvent for removing the adhesive such as 1,1,1-trichloroethane. Then, the entire exposed face of the gasket to be contacted with a separator such as a membrane is coated with an inert grease such as Krytox ® GPL (a trademark of E. I. duPont de Nemours & Co.) to prevent the gaskets from sticking to the membrane. A membrane is interposed between the electrolysis cell frame members containing the gaskets attached thereto. The electrolysis cell frame members with the gaskets attached thereto and the membrane are squeezed together with, for example, a hydraulic squeezer unit. This procedure completes the gasket installation for one electrolysis cell unit. The process is then repeated for any desired number of electrolysis cell frame members. When all of the electrolysis cell units are complete the squeezer is used to compress all the units together. The gasket force set point may be set, for example, at from about 200 psi to about 1200 psi, preferably, from about 600 to about 900 psi to obtain a fluid-tight seal.

What is claimed is:

1. A method for installing gasket members between two adjacent flat plate structures comprising:
   (a) removably attaching a gasket member on each side of a frame member having a rib portion around the outer periphery of the frame member to form a frame member and gasket member assembly;
   (b) interposing the frame member and gasket assembly between at least two flat plate structures disposed adjacent to each other;
   (c) contacting the flat plate structures with the frame member and gasket assembly;
   (d) adhering the gasket members to the flat plate structures diametrically opposed to each other; and
   (e) removing the frame member without the gasket members from between the flat plate structures such that the gasket members remain attached to the flat plate structures.

2. The method of claim 1 wherein the contacting step of the flat plate structures and the frame member and gasket assembly is by compressing together with a hydraulic squeezer.

3. The method of claim 1 wherein the flat plate structures are electrolysis cell frame members.

4. The method of claim 1 wherein the rib is centered around the outer periphery of the frame member.

5. A device for installing gasket members between two flat plate structures adjacent to each other comprising:
   (a) a frame member having a rib portion around the outer periphery of the frame member, said rib portion forming a pair of shoulders opposite each other on each side of the rib portion, said shoulders facing away from each other and adapted for receiving a pair of gasket members such that said gasket members contact the rib portion and protrude a predetermined distance beyond said shoulder members;
   (b) a means for removably attaching said gasket members on each side of the frame member to form a frame member and gasket member assembly; and
   (c) a means for adhering said gasket members to the flat plate structures diametrically opposed to each other.

6. The device of claim 5 wherein the flat plate structures are electrolysis cell frame members.

7. The device of claim 5 wherein the rib is centered around the outer periphery of the frame member.

8. A system for installing gasket members between two adjacent flat plate structures comprising:
   (a) a means for removably attaching a gasket member on each side of a frame member having a rib portion around the outer periphery of the frame member to form a frame member and gasket member assembly;
   (b) a means for interposing the frame member and gasket assembly between at least two flat plate structures disposed adjacent to each other;
   (c) a means for contacting the flat plate structure with the frame member and gasket assembly;
   (d) a means for adhering the gasket members to the flat plate structures diametrically opposed to each other; and
   (e) a means for removing the frame member without the gasket members from between the flat plate structures such that the gasket members remain attached to the flat plate structures.

9. The system of claim 8 wherein the contacting step of the flat plate structures and the frame member and gasket assembly is by compressing together with a hydraulic squeezer.

10. The system of claim 8 wherein the flat plate structures are electrolysis cell frame members.

11. The system of claim 8 wherein the rib is centered around the outer periphery of the frame member.

12. A method for installing gasket members between two adjacent electrolysis cell frame members comprising:
   (a) removably attaching a gasket member on each side of a frame member having a rib portion around the outer periphery of the frame member to form a frame member and gasket member assembly;
   (b) interposing the frame member and gasket assembly between at least two electrolysis cell frame members disposed adjacent to each other; and
   (c) contacting the electrolysis cell frame members with the frame member and gasket assembly such that the gasket members adhere to the electrolysis cell frame members diametrically opposed to each other.

13. A device for installing gasket members between two electrolysis cell frame members adjacent to each other comprising a frame member having a rib portion around the outer periphery of the frame member, said rib portion forming a pair of shoulders opposite each other on each side of the rib portion, said shoulders facing away from each other and adapted for receiving a pair of gasket members such that said gasket members contact the rib portion and protrude a predetermined distance beyond said shoulder members.

14. A system for installing gasket members between two adjacent electrolysis cell frame members comprising:
   (a) a means for removably attaching a gasket member on each side of a frame member having a rib portion around the outer periphery of the frame member to form a frame member and gasket member assembly;
   (b) interposing the frame member and gasket assembly between at least two electrolysis cell frame members disposed adjacent to each other; and
   (c) contacting the electrolysis cell frame members with the frame member and gasket assembly such that the gasket members adhere to the electrolysis cell frame members diametrically opposed to each other.

* * * * *